(No Model.)
A. ISKE.
TIRE TIGHTENER.
No. 362,382. Patented May 3, 1887.
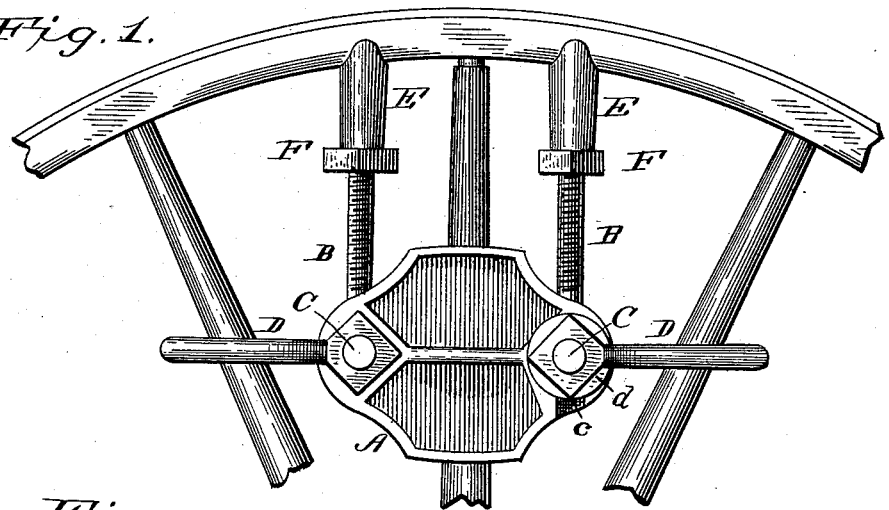
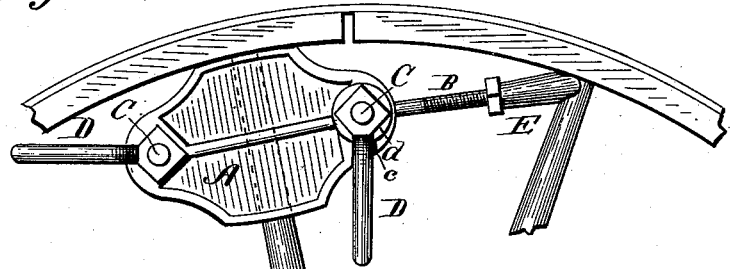
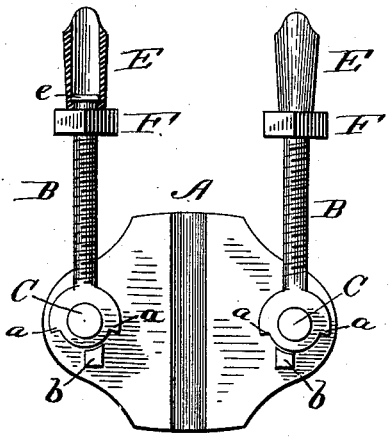
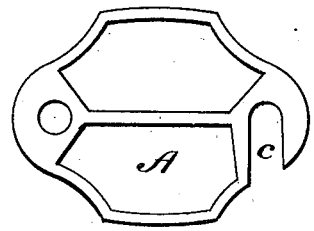
Witnesses
John S. Finch Jr.
Chas. D. Davis
Inventor
A. Iske
By his Attorney
C. M. Alexander

UNITED STATES PATENT OFFICE.

ANTHONY ISKE, OF LANCASTER, PENNSYLVANIA, ASSIGNOR TO ISRAEL L. LANDIS, OF SAME PLACE.

TIRE-TIGHTENER.

SPECIFICATION forming part of Letters Patent No. 362,382, dated May 3, 1887.

Application filed January 22, 1887. Serial No. 225,127. (No model.)

*To all whom it may concern:*

Be it known that I, ANTHONY ISKE, a citizen of the United States, residing at Lancaster, in the county of Lancaster and State of Pennsylvania, have invented certain new and useful Improvements in Tire-Tighteners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in tire-tighteners, it having special reference to that class of devices which are adapted to be clamped to one of the spokes of the wheels being operated upon, as will presently appear.

The invention has for its objects to provide a simple and very effective device that may be quickly and securely clamped to the spoke of a wheel and operated to raise the felly thereof from off the shoulder of the spoke to enable a washer to be inserted; and it consists in certain novel features of construction, which will be more fully hereinafter described, and particularly pointed out in the claims appended.

The above objects I attain by the means illustrated in the accompanying drawings, in which—

Figure 1 is a side elevation of part of a wheel, showing my improved tire-tightener applied to it for raising the felly from off the shoulder of the spoke to receive a washer. Fig. 2 is a side elevation of part of a wheel, showing the same device adjusted for tightening the tire by parting the sections of fellies; Fig. 3, a detached view of my improved device, partly in section, and having one of the clamping-plates removed; and Fig. 4, a detail view of one of the clamping-plates.

Referring to the annexed drawings by letters, A designates the metallic clamping-plates, which I prefer to provide with vertical grooves on their faces for the better grasping of the spoke. Passing transversely through the ends of these plates—one on each side of the spoke—are two clamping-bolts, C, which are provided with lever-nuts D for the purpose of securely clamping the device to the spoke. On the bolts C between the clamping-plates are loosely placed screw-threaded eyebolts B, the eyes of which are provided with shoulders $a$, which, in connection with the lugs or stops $b$ on one of the clamping-plates, serve to limit the movement of the bolts, as is evident. One end of one of the clamping-plates A is slotted at $c$, to allow it to be engaged or disengaged from the bolts C without entirely removing its lever-nut D. This construction permits the device to be quickly and easily attached to the spoke. Between the lever-nut D and the end of the clamping-plate that contains the slot $c$ is interposed a washer, $d$, to form a bearing for the said nut D.

Upon the screw-threaded bolts B are placed the sleeves E, which fit loosely upon the said bolts, and are adjusted thereon by means of the nuts F, which abut against their lower ends. These sleeves are bifurcated at their upper ends to embrace the felly, and are prevented from slipping off their bolts by riveting or enlarging the same at their upper ends, as indicated by the letter $e$ in Fig. 4 of the drawings.

When it is desired to tighten a tire by raising the felly from off the shoulder of a spoke to enable a washer to be inserted, the device is firmly clamped to the spoke, as shown in Fig. 1. The bifurcated ends of the sleeves E are then adjusted against the felly on opposite sides of the spoke, and the tightening effected by turning the nuts F. When it is desired to tighten a tire by separating the sections of the felly to enable a washer to be inserted, I clamp the device to the spoke in close proximity to the felly, adjust one of the sleeves E against the adjacent spoke in close relation to the felly, and effect the tightening by means of the tightening-nut F, as shown in Fig. 2 of the drawings. In this latter case I may or may not remove one of the bolts B.

Having thus fully described my invention, what I claim, and desire to secure by Letters Patent, is—

1. In a tire-tightner, the clamping-plates A, one of which is provided with a slot, $c$, the clamping-bolts C, the lever-nuts D, in combination with the eyebolts, sleeves, and tightening-nuts, substantially as described.

2. In a tire-tightener, the clamping-plates A, one of which is provided with the lugs or stops b, the clamping-bolts, and clamping-nuts, in combination with the eyed tightening-bolts, provided with lugs or shoulders a, and tightening-nuts, and sleeves, substantially as described.

3. In a tire-tightener, the clamping-plates A, one of which is provided with the slot c at one end, the lugs or stops b, formed integral with one of the plates A, clamping-bolts, and the clamping-nuts, in combination with the eyed clamping-bolts B, the eyes of which are provided with the shoulders a, the sleeves, and tightening-nuts, substantially as described.

4. In a tire-tightener, the clamping-plates A, one of which is provided with the slot c at one end, the clamping-bolts, and nuts, in combination with the eyed clamping-bolts B, the upper ends of which are provided with an enlargement, e, the sleeves E, and nuts F, substantially as described.

5. A tire-tightener consisting of the clamping-plates A, one of which is formed with a slot, c, the lever-nuts D, and the stops b, made integral with the plate A, in combination with the eyed clamping-bolts B, the eyes of which are provided with shoulders a and at their upper ends with enlargements e, the sleeves E, and the nuts F, substantially as described.

In testimony whereof I affix my signature in presence of two witnesses.

ANTHONY ISKE.

Witnesses:
ADAM AULT,
JOHN REBMAN.